United States Patent [19]

Eden

[11] 4,030,756
[45] June 21, 1977

[54] MAGNETIC DAMPENED INERTIAL SENSOR FOR BRAKE AND SWAY CONTROLS

[75] Inventor: Edward Joseph Eden, Jackson, Mich.

[73] Assignee: Tekonsha Engineering Company, Tekonsha, Mich.

[22] Filed: Dec. 29, 1975

[21] Appl. No.: 644,600

[52] U.S. Cl. .............................. 303/24 A; 180/104; 188/1 B
[51] Int. Cl.² ............................................. B60T 8/16
[58] Field of Search ............ 180/104; 188/1 B, 158, 188/190, 192, 181 A, 181 R; 303/24 A, 7, 20

[56] References Cited
UNITED STATES PATENTS

| | | | |
|---|---|---|---|
| 2,032,177 | 2/1936 | Logan | 303/24 A |
| 2,152,123 | 3/1939 | Williams | 180/104 X |
| 2,788,457 | 4/1957 | Griest | 188/1 B X |
| 3,538,469 | 11/1970 | Litte et al. | 188/1 B UX |
| 3,637,169 | 1/1972 | Tossmann et al. | 188/1 B X |

*Primary Examiner*—Duane A. Reger
*Attorney, Agent, or Firm*—Miller, Morriss and Pappas

[57] ABSTRACT

A simple and compact light interrupting inertial sensor for brake controls in which a dampening restraint is magnetic. A pendulum structure on a rigid arm is pivotal in a unidirectional or omnidirectional sense and the pendulum weight mass is magnetically attracted and is secured by magnetic attraction against premature movement. The magnet element provides an adjustable attraction by variation in proximity to the magnetically attracted member to provide a high initial resistance to movement and a fast decay of holding force at the threshold of force required for breakaway.

5 Claims, 9 Drawing Figures

U.S. Patent    June 21, 1977    Sheet 1 of 2    4,030,756
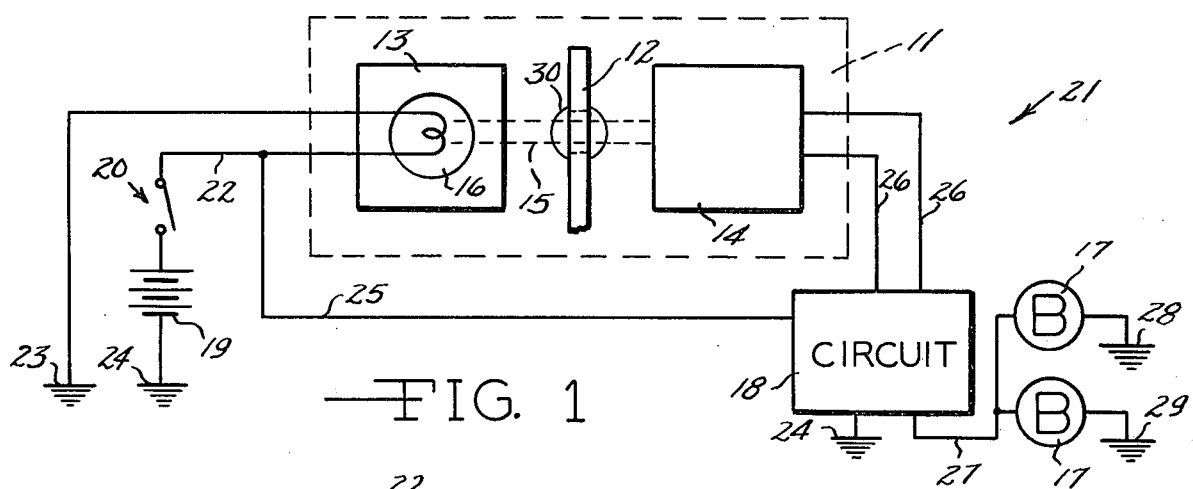
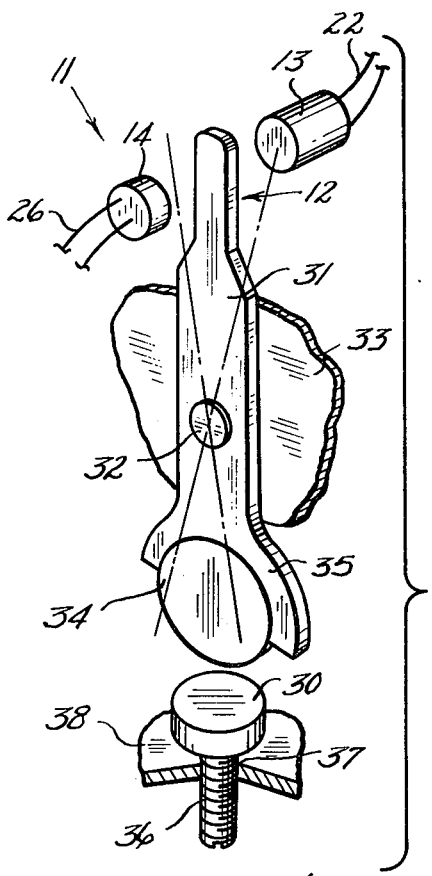
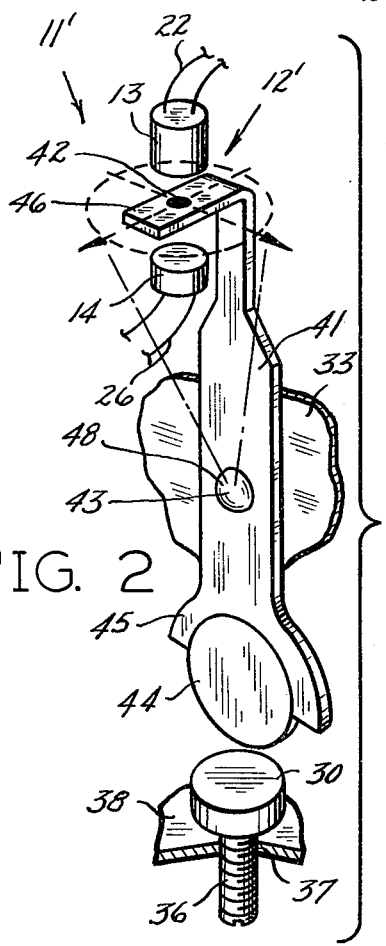
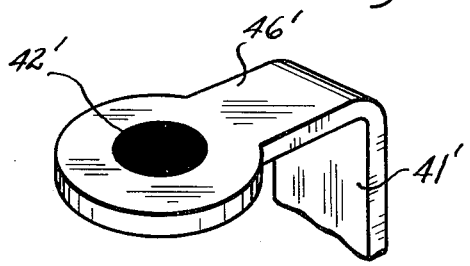
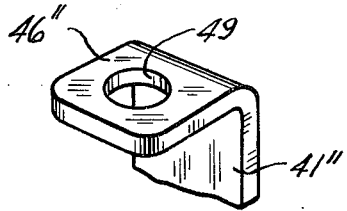

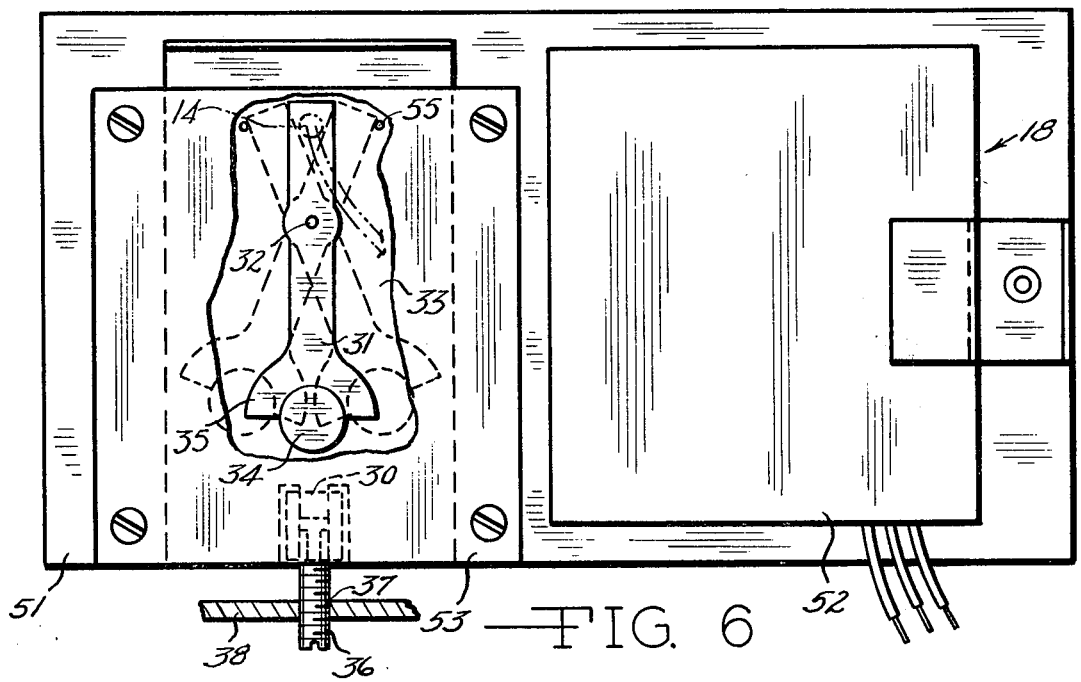
FIG. 6
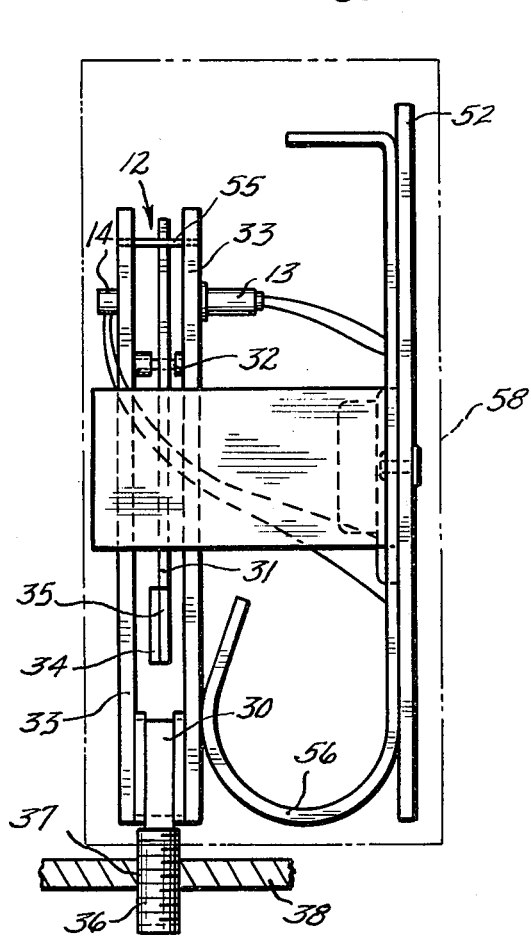
FIG. 7
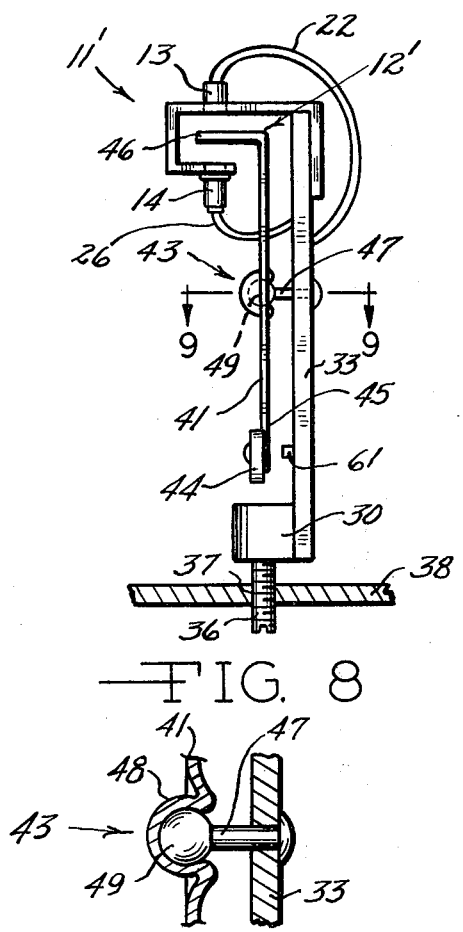
FIG. 8
FIG. 9

MAGNETIC DAMPENED INERTIAL SENSOR FOR BRAKE AND SWAY CONTROLS

The present invention is an inertial sensor for brake controls responsive to vehicular acceleration and deceleration and is particularly amenable to miniaturization, economic construction and is dampened by magnetic means to avoid premature movement of the pendulum at inertial forces below the desired brake energizing threshold. The magnets are adjustable in proximity to the sensing pendulum element and the use of the magnet at a point substantially on the vertical line through the pivot of the pendulum element assures a fast decay of dampening force at breakaway from the magnetic influence. Since the pendulum of the present invention is not required to do mechanical work except overcome the magnet influence and friction at the pivots because it otherwise interrupts a light path, the invention is a compact sensor substantially reducing the control package size and weight in brake and sway control structures and without loss of effectiveness.

BACKGROUND

Brake control devices using electrical and electronic circuitry to apply electrical, hydraulic or pneumatic braking to trailer vehicles in response to sudden deceleration or sudden acceleration forces in the tractor or towing structure are generally well known. Initially such devices were mechanically associated with the brake system or pedal so that depression of the pedal tripped a brake actuator. Such systems involved an inherent lag and were responsive only to the application of brakes in the tractor or towing structure (motor vehicle in the case of travel trailers and the like). Accordingly, attempts were made to apply inertial sensing devices to the problem of sensing for braking of the towed vehicle so that the sensitivity of the system would be responsive to forces generated by the act of braking in the towing vehicle or other change in inertial balance. Such devices and circuits therefore are indicated, for example, in the U.S. Pat. Nos. 2,032,177 to J. W. Logan, Jr. and 3,779,612 to Hans Tschannen. In the copending U.S. patent applications Ser. No. 385,102 to Piettet et al. and Ser. No. 531,171 to Tomecek et al. are unidirectional inertial sensors for brakes in which a light beam is interrupted by a pendulum structure. None of these devices are as simple as the devices of the present invention and none use magnetic dampening and compactness as expressed herein. Many prior art sensors lack the resistance to false tripping by vertical impact forces as by washboard roads and chuckholes.

Accordingly, the principal object of the present invention is to provide a pendulum sensor pivotal from a fixed point and dampened by a magnet to control brakes in towed devices and in control of braking and swaying. A collateral object is to provide a sensor resistant to tripping on swaying or braking forces but insensitive to vertical forces and smooth wide curves.

Another object is to teach a highly compact construction for an inertial sensor for braking in which a light beam is interrupted and to reduce the weight and bulk therein.

Still another object is to provide an improved and less expensive pendulum sensor for braking systems which may be located in the tractor device or the towing device with minimum clearance problems for both brake control or sway control. In the omnidirectional variants of the present invention, a single pendulum is able to sense both sway and braking forces for control over braking. In the unidirectional variations, plural series connected of unidirectional structures faced at right angles to each other are used to achieve braking or sway control or both.

Other objects will be readily appreciated by those skilled in the art as the description proceeds.

IN THE DRAWINGS

FIG. 1 is a schematic circuit diagram of a brake control unit in which a light interrupting element is selectively interposed between a light source and a light responsive target.

FIG. 2 is an exploded perspective view of a unidirectional pendulum inertial sensor in accord with the present invention and indicating the light source and target for the brake control apparatus of FIG. 1.

FIG. 3 is an exploded perspective view of an omnidirectional inertial sensor of the pendulum type in accord with the present invention on a universal pivot and having a transparent arm with an opaque blocking patch positioned in an interruption path between a light source and a target for control of brakes.

FIG. 4 is an enlarged perspective view of the light interrupter portion of the pendulum arm of the present invention and indicating the opaque blocking patch on the otherwise transparent arm.

FIG. 5 is an enlarged perspective view of an arm in accord with the present invention in which the light patch is open until displacement of the pendulum from the vertical and in which the arm is opaque which will, when displaced, alter the light allowed to register upon the sensor and reversing the light circuit logic in FIG. 4.

FIG. 6 is a front elevation view of the control case including the inertial sensor of the present invention and partially cut away to indicate the operational aspects of the pendulum and adjustable magnet.

FIG. 7 is a somewhat schematic end elevation of the structure shown in FIG. 6 and with the outer encasement removed.

FIG. 8 is an end elevation view of a pendulum sensor in accord with the present invention and of the omnidirectional type.

FIG. 9 is a section view taken on the line 9—9 of the FIG. 8 and indicating the ball and socket universal pivot as between the mounting pedestal and the pendulum arm.

GENERAL DESCRIPTION

In general, an inertial sensor is provided which is of the pendulum type and wherein the movement of the pendulum attenuates light as between a source of light and a light sensitive target. The light, in accord with the attenuation provides a control input to a control circuit comprising an amplifier and pulse controlling means which open and close a pawl line to the brakes. The pendulum depends from a pivot point and the pendulum arm is rigid and on the lower end of the arm is a magnetically attractable mass or weight assisting in biasing the pendulum position to the vertical and providing, as will be seen, a material in assistance to dampening the pendulum. Directly beneath the pendulum on a vertical line through the pivot is a magnet and the magnet attracts the magnetically attractable mass in the pendulum arm and thus holds the pendulum in the vertical position and on the line between pivot and magnet until the displacement forces exceed the holding strength of the magnet.

Then, upon inertial forces exceeding the magnet strength, the pendulum breaks away from the magnetic bias. The threshold of the breakaway is adjusted by moving the magnet toward and away from the path of the pendulum. Threaded means provide a simple method for controlled movement of the magnet on the axis defined by the pivot and the pendulum at rest in the vertical position. When the pendulum arm moves, it selectively interferes with a beam of light and hence attenuates that light. The strength or weakness of the light beam determines the magnitude and pulse type (frequency, amplitude, or both) to be applied to the brakes of the towed vehicle. When brakes are applied to the towed vehicle, upon sensing swaying in the towed vehicle, the swaying is suppressed.

When the pendulum is omnidirectional, it senses the inertial forces consequent to braking and swaying and when the magnitude of these forces exceed the bias or attraction between the magnet and pendulum, then the pendulum will move. Such movement of the pendulum arm alters the light passage as between source (on one side of the pendulum) and target (on the other side of the pendulum). Where unidirectional sensors in accord with the present invention are used, they control braking forces to be applied to towed vehicles and provide sway control over braking where the arc of the unidirectional pendulum is transverse of the direction of principal movement of the vehicle and the towed structure. Both sway and brake control are achieved where two unidirectional sensors are provided in series and where the sway control sensor is preferably physically located in the towed vehicle.

Hence, a new sensor has been provided for brake circuits and its simplicity and economy as well as good performance will be better appreciated as the description continues. The brake circuits are preferably of the pulsed type and the circuit as expressed in U.S. patent application Ser. No. 531,171 filed on Dec. 9, 1974 by Tomecek and Hagerty is extremely effective although other brake control circuits can profit from the sensor structures as expressed herein. As will also be appreciated, the sensor is more compact and cheaper to build and assemble in integration or separation with the selected electronic control circuit.

SPECIFIC DESCRIPTION

Referring to the drawings and in particular to the FIG. 1 thereof, the use setting of the present invention is best schematically visualized. The sensor structure 11 of the present invention is broadly appreciated as comprising a movable arm or barrier 12 interposed between a light source and a light sensitive target 14. The beams 15 from the light source 13, such as the light bulb 16, reach the target when the movable arm 12 changes position so as to allow the passage of light or to break the passage of light, as desired. The power for brakes 17, bulb 16, and the power control circuit 18 is derived from the battery 19. The power for pilot actuation of the control circuit 18 to amplification is via the signal generated by light striking the target 14 in accord with selected movement of the barrier 12 as schematically represented. The switch 20 is an on-off switch for the entire brake control 21. A ground return circuit typical of automotive circuitry is illustrated. The light generating circuit is served by light lead 22 and to ground at 23. The battery 19 is grounded at 24, as to the frame of a vehicle, not shown. The power line 25 runs from the line 22 intermediate the battery 19 and bulb 16 to the control circuit 18 where it is pulsed to the brakes 17 in accord with the control required by the magnitude of light sensed and proportional to inertial displacement of the barrier 12. The energy generated by the light sensitive element 14 moves through the leads 26 to the control circuit 18 where amplification occurs and oscillation or pulsing. The thus pulsed line power moves from the control circuit 18 via the lead 27 and to the brakes 17 and their solenoid actuators, for example, not shown. The grounds 28 and 29 are for the brakes.

As will be seen, the element 12 is movable in accord with selected inertial forces and is positioned to respond to forces in the direction of the usual line of travel of a vehicle or trailer or transverse of the line of travel or both. When the movement of the member is parallel to the line of travel then the sensor 11 is energized as a result of movement of element 12 because of sudden acceleration or deceleration. When the movement is transverse of the line of travel, the sensor responds to sway tendecies. When the element 12 is movable omnidirectionally, then both braking and sway forces are sensed and the controlled brakes (as in a towed vehicle) respond to the sensed condition. The omnidirectional units may be located in either the towed or towing vehicle but the breakaway threshold is best based on location in the towed vehicle. The leads 26 from the light sensitive element 14 run to the electronic control and conduct an EMF in accord with the amount of light caught on the target 14. Power, as modulated by the control circuit 18 (pulsed, for example) passes through the power lead 27 and to the parallel brakes 17 grounded at 28 and 29. The magnet 30 is located directly beneath the movable arm or barrier 12 and in spaced-apart relation but where its flux lines influence or dampen the movement of the barrier 12.

In most instances the barrier 12 will block the passage of light until an inertial imbalance occurs which moves the barrier and where that inertial imbalance is of a magnitude overcoming the magnetic dampening. Then, the breakaway is clean and fast. Thus, a part of the barrier or arm 12 is magnetic. In some instances it is preferable to reverse the circuit logic and the role of the arm 12 and allow penetration of the light beam 15 through the barrier, as by using a transparent window or an open aperture when the barrier 12 is at rest so that the light source 13 can be seen by the light sensitive target 14 when the structure is in the vertical position and the arm 12 is aligned between pivot and magnet 30. It will also be appreciated that in some designs the magnet 30 may be made a part of the arm 12 and is then adjusted toward and away from a magnetically attractable surface. Sometimes it may also be desirable to allow the magnetically attractable surface to be adjusted toward and away from the magnet 30, but physically gapped therefrom so that the release threshold structure will determine which of these forms of the invention are preferred.

In FIG. 2 the barrier 12 and the sensor 11 are seen in their simplest unidirectional form. The rigid pendulum arm 31 is pivotally supported on the pin 32 and the pin 32 extends through and is supported by the frame or case 33. A magnetically attractable mass 34 in the general form of a metal (iron) wafer is clutched by the depending yoke 35 of the arm 31. The magnitude of the mass 34 is selected to provide general pendulum characteristics as desired in a particular application. The barrier 12 of the arm 31 is paddle-like and when the pendulum arm 31 is in the vertical position as shown, the barrier 12 blocks the movement of light between the light source 13 and the light sensitive target 14. The magnet 30 immediately below the pendulum arm 31 and on the vertical line through the pivot pin 32, is attached to threaded means 36 and 37 in the base 38 so that it is movable toward and away from the pendulum arm 31 and the magnetically attractable wafer 34. In the unidirectional sensor of FIG. 2 the sensor 11 functions to respond to inertial forces moving the arm 31 in a plane transverse to the axis of pin 32. To sense sway, the axis of the pin 32 is parallel to the principal direction of vehicle movement. To monitor braking the axis of the pin 32 is transverse of the principal direction of vehicle movement. The rigid arm 31 is cut from relatively flat stock such as plastic or metal sheet. It is pivotally fastened to the frame 33 in spaced-apart parallelity and the light transmitting and receiving elements 13 and 14 are easily supported in the frame 33 and the magnet 30 is secured to the base 38 so that ultimate compactness and simplicity of design results. The magnet 30 is selected and oriented to provide the most desirable flux pattern and may vary somewhat depending on the type of magnet material used and its particular flux characteristics.

In FIG. 3 optimum compactness is slightly compromised to achieve an omnidirectional sensor 11'. The rigid arm 41 is made partially or completely of transparent stock such as transparent plastic and the barrier 12' is an opaque plug 42 interrupting light passage between the light source 13 and the light sensitive target 14. The arm 41 depends universally from a socket or universal mounting 43 and thus is capable of omnidirectional sensing. The magnetically attractable mass 44 is supported by the arm 41 by the yoke 45 and causes the arm 41 to normally depend from the mounting 43 as shown. The adjustably positioned magnet 30 in response to the cooperating threaded means 36 and 37 in the base 38 assures this normal position until the strength of the magnet is overcome by sensed forces. The magnet 30 is located directly beneath the universal mounting 43. As the arm 41 moves under inertial influence, the normally horizontal and transparent platform 46 of the arm 41 correspondingly moves and depending on the extent of movement attenuates the light passing between the light source 13 and the target 14. The universal mounting 43 is preferably a ball headed stud 47 (FIG. 9) secured to the frame 33 and projecting into the enclosure where the sensor 11' is located. The ball socket 48 grasps the ball 49 of the arm 41 but may be separately secured to the arm 41. As universally supported, the arm 41 is a universally movable pendulum from the mounting at 43. Hence, the function of the FIG. 2 modification is to permit control sensing for sway and for braking since any imbalance is felt by the sensor beyond the limit imposed by the magnet 30 and is relayed by the target element 14 through the leads 26 to the electronic control circuit 18 as attenuated.

FIG. 4 is a modified transparent platform 46' which includes an opaque plug or spot 42' as a barrier 12 to light transmission when the arm 41' is at rest. The platform 46' may be integrally attached to the upper end of the arm 41' or may be separately attached.

FIG. 5 shows a form of platform 46'' in which an opening 49 is provided through an opaque arm 41'' and platform 46'' so that attenuation occurs by inertial imbalance reducing the amount of light passed to the light sensitive element 14 and in reversal of the logic of the FIG. 4 structure.

FIGS. 6 and 7 indicate the relative assembly simplicity of a brake control structure in which the sensor elements of the present invention are integrated, and the pendulum structure is as generally shown in FIG. 2. The back plate 51 provides a mounting base for electronic components and circuit boards in the enclosures 52 and 53 as broadly seen in FIG. 6. The enclosure 53 forms a support for the frame 33 for pivot 32 and the arm 31 depends from the pivot 32 downwardly as shown. The magnetically attractable mass 34 is secured to the lower end of the pendulum arm 31. This suspends the mass 34 over the magnet 30. The magnet 30 is moved toward and away from the mass 34 and pendulum 31 by means of the threaded element 36 passing through the threaded base element 38. The barrier 12 moves with the rigid arm 31 between the light source 13 and the light sensitive target 14 thereby attenuating the light seen by the target 14 in accord with the amount of displacement of the arm 31. Stops 55 prevent overrun of the pendulum arm 31. In the FIG. 7 the heat sink 56 is shown to which is secured heat generating electronic components as required in the control circuit 18. The preferred control circuit is as generally expressed in the U.S. application for Letters Patent Ser. No. 531,171 to Tomecek and Hagerty. The outer encasement 58 of the control structure shown in broken lines is subject to selected aesthetic treatment and stylization.

FIG. 8 shows a profile view of the unit seen in FIG. 3 as it appears assembled in a control package such as the encasement 58 to provide omnidirectional sensing of inertial forces as generated by swaying and braking and as dampened in response by the magnet 30. The relationship of the components have been described in reference to FIG. 3 and it is not felt that further description is required except to designate the stop or bumper 61 which prevents overrun of the pendulum arm 41. Similarly, FIG. 9 shows the universal or ball and socket support 43 in substantial detail.

OPERATION

In operation, the present invention works in excellent force monitoring control of the braking circuits especially as devised to coordinate function as between a tractor and trailer or automobile and towed vehicle. The inertial sensor 11 and 11' are relatively flat so that miniaturization of the controls is relatively simply accomplished without resort to exotic and expensive exponents such as found in mercury pools, fluid dampened sensors, electrical contacts using ramped balls and the like. The use of the magnetic dampening allows the sensitivity of the system to be adjusted to suit selected operating conditions. The structures in accord with this description have a restrained breakaway point preventing premature braking and premature sway sensing. In addition, the herein described controls are relatively insensitive to vertical components of force.

Having thus described my invention and several operative modifications thereof, those skilled in the art will readily perceive other improvements, modications, and changes and any such improvements, modifications and changes are intended to be included herein, limited only by the scope of my hereinafter appended claims.

I claim:

1. A pendulum type inertial sensing device for controlling brakes in towed vehicles by interference with light transmission comprising:
   a frame;
   a rigid pendulum arm;
   a pivot operably connected to said frame from which said pendulum arm depends;
   a magnetically attractable material at the lower end of said pendulum arm;
   a magnet beneath said pivot and supported by said frame and in selected spaced-apart relation to said magnetically attractable material;
   a light source;
   a light monitoring target toward which said light source is directed;
   a light interrupter on said arm which selectively attenuates light from said light source to said target in accord with the positioning of said arm;
   an electric braking circuit controlled by the light transmitted between said source and said target and pulsing a power output therethrough; and
   brakes energized by said braking circuit in accord with the movement of said arm.

2. In the structure of the combination of claim 1 wherein said magnet is adjustable positionable toward and away from the path of said pendulum on the vertical line between said pivot and said magnets.

3. In the combination of claim 2 wherein said pivot is omnidirectional.

4. In the combination of claim 1 wherein said arm selectively interrupts a light beam and attenuates said light beam dependent upon amount of movement of said pendulum from the vertical.

5. An inertial type sensor for brake and sway control in towed vehicles comprising:
   a frame;
   a rigid arm operably secured in said frame and including a magnetically attractable mass located at the depending end of said arm and said arm including a light interrupter;
   a pivot supported by said frame and connected operably to said arm whereby said arm depends normally from said pivot in a substantially vertical position;
   a light source on one side of said arms;
   a light monitoring target on the other side of said arm in the light path of light from said source and selectively interrupted by said light interrupter on said arm;
   a magnet beneath said pivot and in spaced-apart relation to said magnetic mass on said arm;
   an electic braking circuit controlled by the light transmitted between said source and said target and pulsing a power output therethrough; and
   brakes in a towed vehicle controlled and energized by said braking circuit in accord with the movement of said pendulum.

* * * * *

UNITED STATES PATENT OFFICE
CERTIFICATE OF CORRECTION

Patent No. 4,030,756    Dated 1977 June 21

Inventor(s) Edward Joseph Eden

It is certified that error appears in the above-identified patent and that said Letters Patent are hereby corrected as shown below:

Column 4, line 23, "tendecies" should read
--- tendencies ---

Column 5, line 52, after "of the" insert ---
stud 47 in easy journal relation. The socket
48 is integrally formed in the ---

Column 8, line 23, Claim 5, "electic" should
read --- electric ---

Signed and Sealed this

Twentieth Day of September 1977

[SEAL]

Attest:

RUTH C. MASON  
Attesting Officer

LUTRELLE F. PARKER  
Acting Commissioner of Patents and Trademarks